May 29, 1934.                H. E. HERSHEY                 1,960,781
                              SELECTING SYSTEM
                           Filed Feb. 20, 1931            4 Sheets-Sheet 1

Fig. 1

Inventor
Harry E. Hershey
Wm. Walter Owen
Atty.

May 29, 1934.  H. E. HERSHEY  1,960,781
SELECTING SYSTEM
Filed Feb. 20, 1931  4 Sheets-Sheet 2

Fig. 2

Inventor
Harry E. Hershey

Patented May 29, 1934

1,960,781

UNITED STATES PATENT OFFICE 1,960,781

SELECTING SYSTEM

Harry E. Hershey, Oak Park, Ill., assignor, by mesne assignments, to Associated Electric Laboratories, Inc., Chicago, Ill., a corporation of Delaware Application February 20, 1931, Serial No. 517,254

3 Claims. (Cl. 177—353)

This invention relates in general to an improved selecting system for simultaneously selecting a large number of devices any one of which may, thereafter, be individually controlled in any desired sequence. More specifically, this invention relates to the selection and operation of signalling devices associated with a dispatcher's music supervisory display board.

In systems for controlling the distribution of electrical energy, or the like, it is customary to provide a centralized dispatching or directing office and to provide the dispatcher thereat with a supervisory display board showing a complete one-line diagram illustrating the entire system and the position of all the switching units under his control. Display boards of this type have symbols for indicating the various switching units and in the latest display boards electrically-controlled signalling devices are associated with the symbols for indicating the condition of the switching units which the symbols represent.

It is desirable for the dispatcher to control the operation of these signalling devices in such a manner that the display board will indicate the actual condition of the system in the field, or any proposed changes which the dispatcher may desire to order in the field. The sequence of operation of the switching units in the groups in the field may vary with different power changes and it is, therefore, necessary for the dispatcher to accordingly vary the sequence of operation of the signalling devices in the corresponding groups. It is, therefore, desirable for the dispatcher, in order to make changes in the display board correspond to changes in the field, to be able to select a group of signals on the board corresponding to a group of units in the field and be able thereafter to operate the selected signals in any desired sequence without further selection.

The object of the invention, therefore, is to provide a selecting system for enabling the dispatcher to simultaneously select a plurality of groups of signalling devices associated with the display board in response to a single selecting operation, for enabling the dispatcher to associate his control devices with any of the selected groups, and for individually operating the devices in any selected group in any desired sequence.

Another object of the invention is to provide an indicating arrangement for indicating to the dispatcher the particular groups of devices selected and the association of the dispatcher's control devices with a particular one of the groups.

Further objects and features of the invention will be apparent from the following description and drawings in which.

Before proceeding with the detailed description, a brief description will be given of the selecting operations. For this purpose, it will be assumed that the dispatcher desires to change the connection between a line and one or more busses, for example line AB, bus A, and bus B in Fig. 4. Since the signalling devices of a group may be operated in a certain sequence at one time and in a reversed or different order at another time to change the connection between a line and a bus, it is essential that a selecting arrangement be provided so that the dispatcher may select the groups of signalling devices associated with a line, such as line AB, and thereafter individually control the separate signalling devices in any desired sequence. In order to meet this condition, the group selector shown in Fig. 2 is operated to select two final selectors, such as AS and BS, which have access to the groups of signalling devices associated with the AB line. The final selectors are simultaneously operated to corresponding positions to prepare the circuits of the signalling devices of two of these groups at different points, for example, points A and B. After the final selectors AS and BS have selected the signalling devices of a line where changes should be made, the dispatcher by operating the lever key LK selects the group of devices accessible from the A switch or the group of devices accessible from the B switch and by the operation of a key, such as keys LD, OS, BP, and BD corresponding, respectively, to line disconnect, oil switch, by-pass, and bus disconnect, may operate any of the signalling devices in any desired sequence. The lamp panel shown in Fig. 1 indicates the exact positions of the switch wipers so that the dispatcher knows that the proper line and groups of devices have been selected.

This application may be considered as an improvement to my copending application, Serial No. 502,111, filed December 13, 1930, and is illustrated in connection with and for selecting and operating signalling devices associated with a dispatcher's mimic supervisory display board, such as is disclosed in the White application, Serial No. 425,121, filed February 1, 1930.

Figure 1:
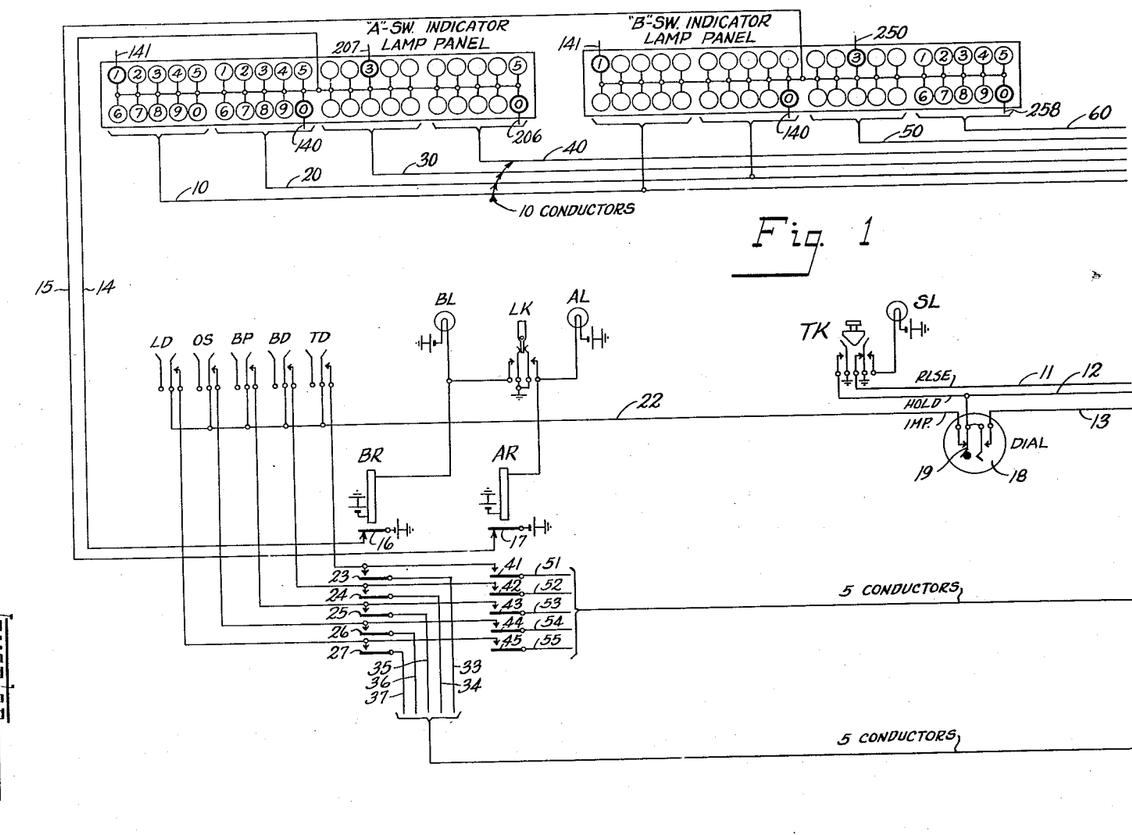
Fig. 1 diagrammatically represents a dispatcher's position having means for controlling a group selector.
Figure 2:
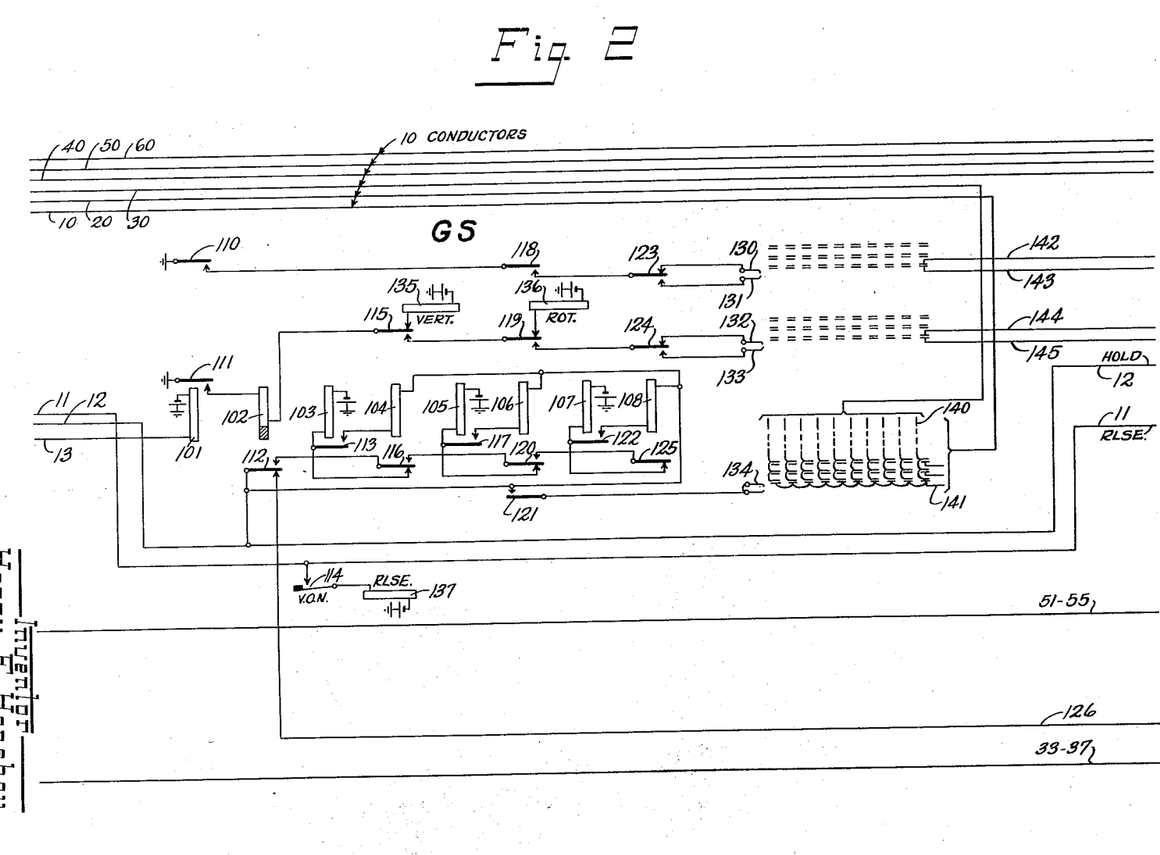
Fig. 2 diagrammatically represents the group selector which is operated by the dispatcher to select and simultaneously operate two final selectors.
Figure 3:
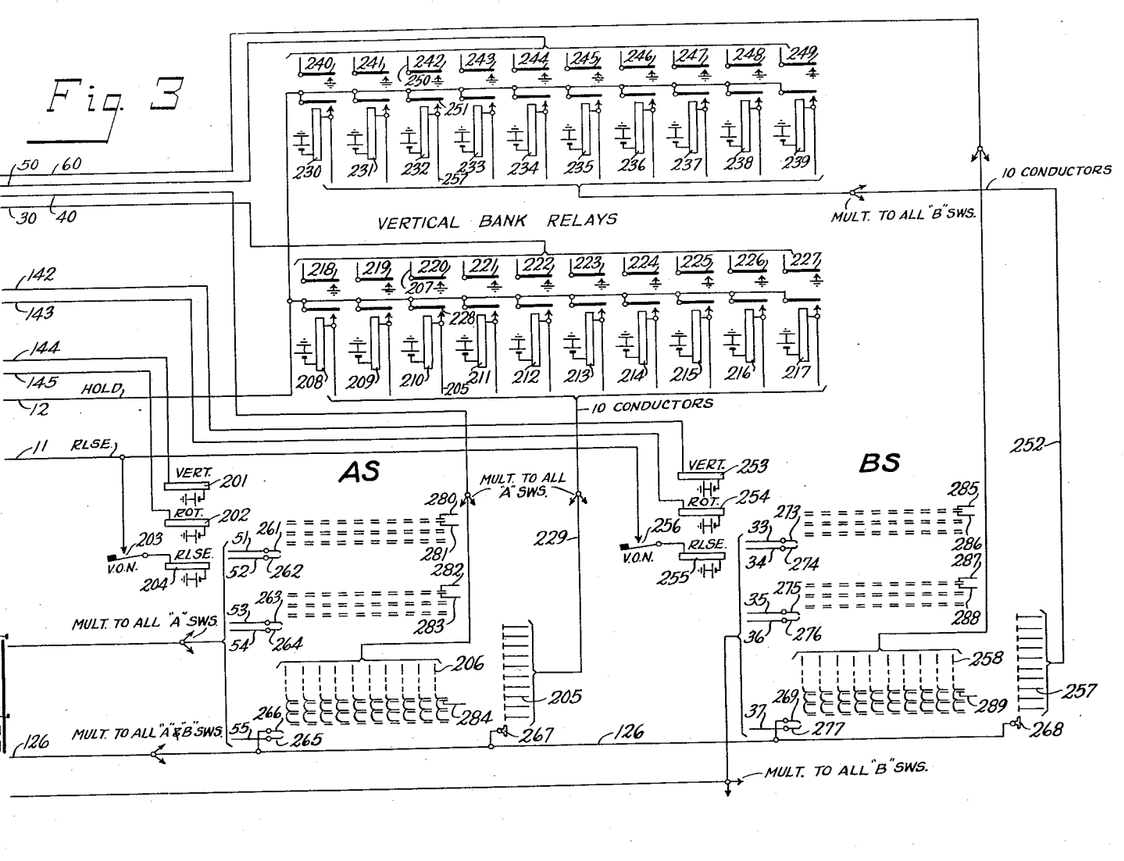
Fig. 3 represents two final selectors which are simultaneously operated to select groups of signalling devices associated with a dispatcher's mimic supervisory display board.

Referring now to Fig. 1, in more detail, two lamp panels, each comprising forty lamps, are diagrammatically illustrated for indicating to the dispatcher the respective positions of the wipers of the A and B switches shown in Fig. 3, and for indicating the position of the wipers of the group selector GS shown in Fig. 2. Each lamp in the above-mentioned panel has an individual conductor extending to certain of the bank contacts of the switches mentioned, and said individual conductors are diagrammatically illustrated by the conductors 10, 20, 30, 40, 50, and 60 which are in reality ten-conductor trunks. The operate keys LD, OS, BP, BD, and TD are located at the dispatcher's desk and are the keys for individually controlling the operation of the signalling devices shown in Fig. 4. The lever key LK is also located at the dispatcher's desk and is used, depending upon the direction operated, for controlling the BR or AR relays which, in turn, connect the operate keys, shown to the left, to the wipers of the A and B switches, such as AS and BS, shown in Fig. 3. The station cut-in-turn key TK and calling device, or dial, similar to the dial used in automatic telephone systems are also associated with the dispatcher's desk and are operated when the dispatcher desires to make a selection. Associated with the lever key LK and the turn key TK are lamps BL, AL, and SL for indicating the operated condition of such keys.

The group selector GS, shown in Fig. 2, is of the well-known type of Strowger vertical and rotary step-by-step switch in which the wipers 130 to 134, inclusive, are first operated step-by-step in a vertical direction by the vertical magnet, and then rotated step-by-step by the rotary magnet over the bank contacts illustrated. The control circuits of the group selector have been shown in full, while only a portion of the selector banks are shown connected for use, it being understood that the remaining bank contacts are wired in a manner similar to those shown connected up for use. As shown in Fig. 2, the group-selector bank comprises three sets of banks, the upper two of which are connected to two groups of final selectors, two of which are shown in Fig. 3; while the lower set of bank contacts are multipled in the manner illustrated and extend over conductors, such as the ten-conductor trunks 10 and 20 to the lamp-indicating panels shown in Fig. 1. The lower bank contacts in each horizontal row, or level, of the group selector are connected by conductors to the left-hand or the first set of lamps in each panel. The upper bank contacts in each vertical row are connected by a ten-conductor trunk 20 to the second set of lamps "1" to "0", inclusive.

The final selectors AS and BS shown in Fig. 3 are mechanically similar to the group selector shown in Fig. 2 and comprise only a plurality of wipers and operating magnets for operating the same. The upper bank contacts in the lower set of bank contacts are multipled vertically and extend to the A-switch and B-switch lamp panels over the ten-conductor trunks 40 and 60. These ten-conductors are multipled to corresponding vertical rows in each A-switch to which the group selector GS has access. In addition to the wipers 261 to 266, inclusive, the final selectors have vertical wipers such as wipers 267 and 268. The vertical wipers are used for marking the level to which the final selector has been operated. The upper two sets of bank contacts and the lower bank contacts in the lower set are each individually connected by way of a conductor, such as conductors 280 to 284, to the signalling devices located in the dispatcher's mimic supervisory display board. Corresponding wipers in all the A switches are multipled together over conductors 51 to 55, inclusive, and corresponding wipers in all the B switches are similarly multipled over conductors 33 to 37, inclusive. The lower set of vertical bank relays, 208 to 217, inclusive, are common to all the A switches and are connected by a ten-conductor trunk 229 to the vertical bank contacts accessible to the vertical wipers of all the A switches. In a similar manner the upper set of vertical bank relays are common to all of the B switches and are connected to the vertical bank contacts in the same manner as described for the A switches. The armatures 218 to 227, inclusive, of the lower vertical bank relays are connected to the third set of lamps in the A-switch lamp panel by way of the ten-conductor trunk 30. In a similar manner the armatures 240 to 249, inclusive, of the upper vertical bank relays are connected to the third lamp set in the B-switch lamp panel by way of the ten-conductor trunk 50.

Figure 4:
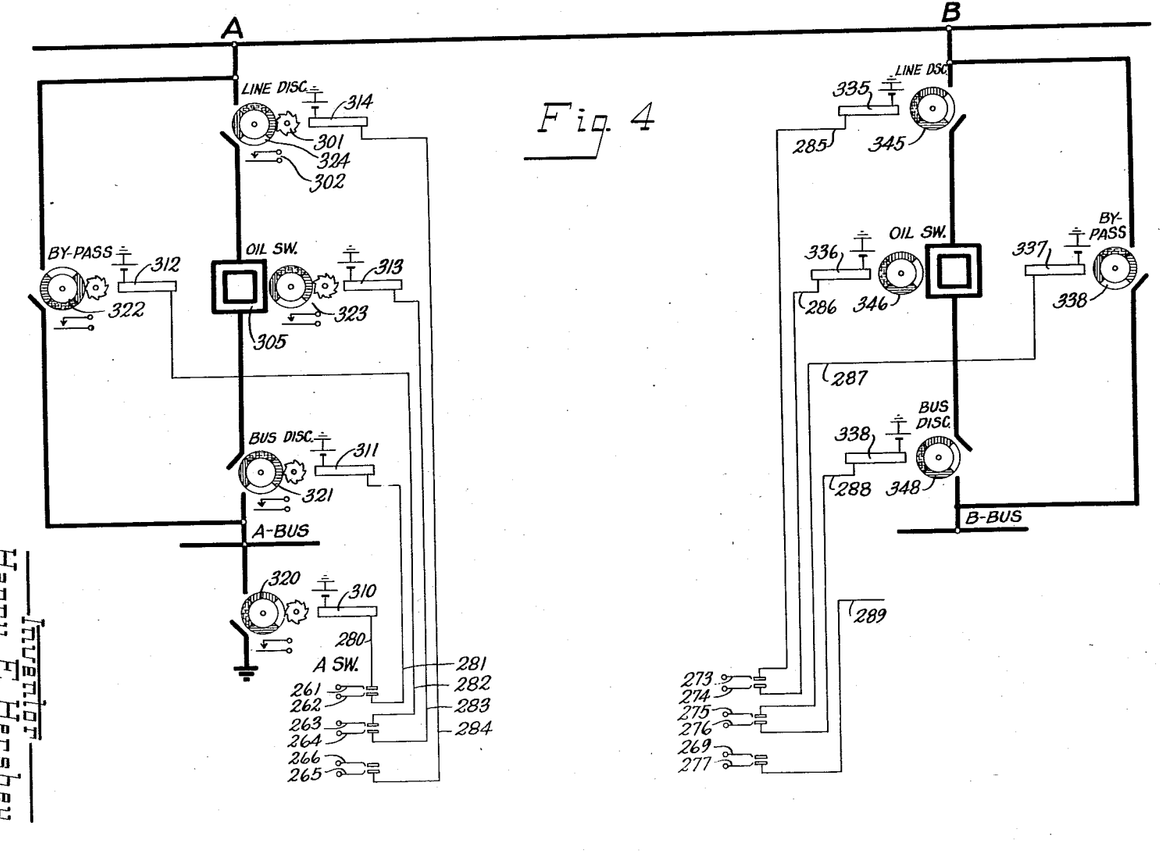
Fig. 4 represents a portion of the dispatcher's supervisory display board.

Fig. 4 diagrammatically shows a portion of the dispatcher's mimic supervisory display board and represents a power line and various switching units in the field. The power line No. 1030, hereinafter referred to as line AB, represents a power line of a certain voltage. Connected to this line at points A and B are junction lines which have groups of symbols representing a line disconnect, an oil-switch circuit breaker, a bus disconnect, and a by-pass for connecting and disconnecting the AB line to the A or B buses. Opposite each of these symbols is a mechanical signalling device, similar to the device show in the Obergfell application, Serial No. 455,012, filed May 23, 1930. Each of these devices includes a stepping magnet, such as 314, and a ratchet, such as 301, for rotating a colored drum, such as 324. The colored drum is visible through the opening in the face equipment of the mimic supervisory board, and the color which is seen therethrough is indicative of the position of the device which it represents. Each of the stepping magnets, such as magnets 310 to 314 and 335 to 338, are accessible from the final selector switches in the manner illustrated.

Having given a general description of the system, a detailed description of the system and its operation will now be given. For this purpose, it will be assumed that the dispatcher desires to select the groups of signalling devices associated with the line No. 1030 at points A and B in order to control the signalling devices thereat. The dispatcher turns the station cut-in key TK to ground the hold conductor 12 at its outer left-hand contact, to remove ground from the release conductor 11, so that the group selector and final selectors will not release when operated, and close an obvious circuit for lighting the station lamp SL. In order to select the signalling devices associated with the line AB at points A and B, the dispatcher will dial the digits 1—0—3—0.

Responsive to the operation of the dial for the first digit, or digit 1, the impulse springs 18 of the dial close a circuit from the grounded hold conductor 12 to the impulse conductor 13 for energizing line relay 101 of the group selector GS. Line relay 101 at armature 111 closes a circuit for energizing the slow-to-release relay 102 in series with the vertical magnet 135 by way of armature 115 and its resting contact. At armature 112 relay 102 closes a circuit from the grounded hold conductor 12 for energizing relay 103 by way of armature 116 and its resting contact. At armature 113 relay 103 prepares a circuit for energizing relay 104, but the latter relay cannot energize at this time because the same is short circuited. By the operation of the vertical magnet 135, the wipers 130 to 134, inclusive, are operated opposite the first level of bank contacts. Responsive to the operation of the switch shaft and wipers, the off-normal springs 114 close to prepare a circuit to the release magnet 137. As soon as the impulse springs 18 of the dial open, the line relay deenergizes and in turn opens the circuit of relay 102 and vertical magnet 135. After an interval of time for which it is adjusted, slow-to-release relay 102 deenergizes and at armature 112 removes the short circuit from around relay 104, whereupon relay 104 energizes in series with relay 103 over the following circuit: grounded hold conductor 12, winding of relay 104, armature 113 and through the winding of relay 103 to battery. Relay 103 is maintained energized over this circuit and relay 104 at armature 115 opens the circuit extending to the vertical magnet at its resting contact, and at its working contact prepares the circuit to the rotary magnet 136. At armature 116 relay 104 opens the original energizing circuit of relay 103 at its resting contact, and at its working contact prepares a circuit for relay 105.

The dispatcher may now dial the next digit, or digit 0, and responsive to the operation of the dial, the impulse springs 18 are closed ten times to operate the line relay 101 a corresponding number of times. At each operation of the line relay 101, a circuit is completed for operating the rotary magnet 136 in series with relay 102 as follows: from ground at armature 111, winding of relay 102, armature 115 and its working contact, armature 119 and its resting contact and through the winding of rotary magnet 136 to battery. The slow-to-release relay 102 is maintained energized during the impulsing period while the rotary magnet 136 rotates the wipers 130 to 134, inclusive, into engagement with the tenth set of bank contacts in the first level. At armature 112, relay 102 closes a circuit for energizing relay 105 as follows: from grounded hold conductor 12, armature 112 and its working contact, armature 116 and its working contact, armature 120 and its resting contact, and through the winding of relay 105 to battery. Relay 105, upon energizing, at armature 117 prepares a circuit for energizing relay 106, but the latter relay cannot energize at this time because the same is short circuited. When relay 102 deenergizes after the impulsing period, the short circuit around relay 106 is removed and this relay is energized in series with relay 105 from the grounded hold conductor 12 by way of armature 117. The relay 105 is maintained energized in series with relay 106, and the latter relay at armature 120 opens the original energizing circuit at relay 105 at its resting contact and at its working contact prepares a circuit for energizing relay 107. At armature 118, relay 106 prepares an impulsing circuit for the vertical magnet of the B switch over wiper 130; at armature 119 disconnects the motor magnet 136 and prepares an impulsing circuit to the vertical magnet of the A switch over wiper 132; and at armature 121 connects the grounded hold conductor to wiper 134 for lighting lamps in the A-switch and B-switch indicator lamp panels. Since the wipers of the group selector GS have been rotated to the tenth contact in the first level, circuits for lighting the No. 1 lamp in the first lamp set and No. 0 lamp in the second lamp set in both panels may now be traced as follows: from grounded hold conductor 12, armature 121, wiper 134, conductor 141, included in the ten-conductor trunk 10, conductor 141 at the indicator panel, through the lamps "1", conductors 14 and 15, armatures 16 and 17 to battery. The circuit for lighting the "0" lamp of the second set in both panels may be traced as follows: from wiper 134, conductor 140, included in the ten-conductor trunk 20, conductor 140 at the indicator panel, through the "0" lamps in the second sets, conductors 14 and 15, and through armatures 16 and 17 to battery. By observing the lighting of the lamps in the two lamp panels, the dispatcher can easily determine if the group selector has properly responded to the impulses dialled in the first two digits.

After observing the lighting of the lamps the dispatcher may dial the third digit, or digit 3, whereupon the line relay 101 of the group selector is energized and deenergized three times in a manner similar to that previously described. At armature 110, relay 101 transmits impulses to the vertical magnet 253 of the switch BS over the following circuit: from ground at armature 110, armature 118, armature 123 and its resting contact, wiper 130, the upper tenth bank contact in the first level, conductor 142, and through the winding of vertical magnet 253 to battery. Simultaneously with the closing of the above impulsing circuit, another impulse-circuit is closed to the vertical magnet 201 of the switch AS as follows: from ground at armature 111, winding of relay 102, armature 115 and its working contact, armature 119 and its working contact, armature 124 and its resting contact, wiper 132 in engagement with the upper tenth bank contact in the first level, conductor 144, and through the winding of vertical magnet 201 to battery. Relay 102 is energized over the above-traced circuit, and at armature 112 closes a circuit for energizing relay 107 as follows: grounded hold conductor 12, armature 112 and its working contact, armature 116 and its working contact, armature 120 and its working contact armature 125 and through the winding of relay 107 to battery. Relay 107, upon energizing, at armature 122 prepares a circuit for energizing relay 108, but the latter relay cannot energize at this time because the same is short circuited. Responsive to the operation of the vertical magnet 201 over the above-traced circuit, the wipers 261 and 267, inclusive, are operated three steps in a vertical direction, the wipers 261 to 266, inclusive, being operated opposite the third level of bank contacts, while the vertical wiper 267 is operated into engagement with the third vertical contact. On the first vertical step of the shaft and wipers the off-normal springs 203 close to prepare a circuit to the release magnet 204. In a similar manner, the wipers 273 to 277, inclusive, and wipers 268 and 269 are operated three steps by the vertical magnet 253. The wipers 273 to 277, inclusive, and wiper 269 are operated opposite the third level of bank contacts while the vertical wiper 268 is operated into engagement with the third vertical contact. The vertical off-normal springs 256 prepare a circuit for operating the release magnet 255 on the first vertical step of the wipers. Shortly after this train of impulses the slow-to-release relay 102 deenergizes and removes the short circuit from relay 108 with the result that relay 108 energizes in series with relay 107 over an obvious circuit. Relay 108, upon energizing, at armature 123 transfers the impulsing circuit from vertical magnet 253 to rotary magnet 254; at armature 124 transfers the impulsing circuit from the vertical magnet 201 to the rotary magnet 202; and at armature 125 opens the original energizing circuit of relay 107 which is now maintained energized in series with relay 108 by way of the grounded hold conductor 12. Another result of the deenergization of the slow-to-release relay 102, at this time, is the grounding of common conductor 126 from the grounded hold conductor 12. When the common conductor 126 is grounded, a circuit may be traced by way of the vertical wiper 267, third vertical bank contact, conductor 205 included in the ten-conductor trunk 229, conductor 205 and through the winding of relay 210 to battery. Relay 210 energizes over the above-traced circuit and at armature 228 completes a locking circuit for itself from grounded hold conductor 12, and at armature 220 grounds the conductor 207 included in the ten-conductor trunk 30 extending to the third lamp set in the A-switch indicator lamp panel for completing a circuit for illuminating lamp "3" therein by way of conductor 207, lamp 3, conductor 14, and armature 16 to battery. In a similar manner the "3" lamp in the third lamp set of the B-switch indicator lamp panel is illuminated over conductor 250 by one of the upper vertical bank relays. The grounding of conductor 126 also closes the following circuit from grounded conductor 126, vertical wiper 268, the third vertical bank contact, conductor 257 included in the ten-conductor trunk 252, conductor 257, and through the winding of relay 232 to battery. At armature 251, relay 232 locks itself to the hold conductor 12, and at armature 242 grounds conductor 250 extending by way of the ten-conductor 50 to the third lamp set in the B-switch indicator lamp panel, by way of conductor 250, through the "3" lamp, conductor 15, and by way of armature 17 to battery. By observing the lighting of these lamps in the indicator panels, the dispatcher is advised of the exact location of the wipers of switches AS and BS.

The dispatcher may now dial the last, or digit 0, in order to select the signalling devices associated with points A and B on the line #1030. Responsive to the operation of the dial for the last digit, the line relay 101 is again operated in the manner previously described, and at armature 110, transmits impulses to the rotary magnet 254 over the following circuit: ground at armature 110, armature 118, armature 123 and its working contact, wiper 131 in engagement with the lower tenth bank contact in the first level, conductor 143, and through the winding of rotary magnet 254 to battery. At armature 111, rotary magnet 254 to battery. At armature 111, relay 101 transmits impulses to the rotary magnet 202 over the following circuit: grounded armature 111, winding of relay 102, armature 115 and its working contact, armature 119 and its working contact, armature 124 and its working contact, wiper 133 in engagement with the lower tenth bank contact in the first level, conductor 145, and through the winding of rotary magnet 202 to battery. At armature 112, relay 102 removes ground from the common conductor 126, thereby preventing the flashing of lamps as the wipers 266 and 269 are rotated over their bank contacts. By the operation of the rotary magnets 202 and 254, the vertical wipers 267 and 268 of the AS and BS switches are rotated out of engagement with their vertical contacts and the line wipers of such switches are rotated into engagement with the tenth set of bank contacts in the third level. When the wipers of the final selector reach their tenth contacts in response to the impulses transmitted by line relay 101, and when slow-acting relay 102 deenergizes to again ground common conductor 126, a circuit may be traced for lighting the "0" lamp in the last lamp set in both of the indicating lamp panels at the dispatcher's position. The circuit for energizing the 0 lamp in the A-switch indicator lamp panel may be traced as follows: from grounded common conductor 126, wiper 266 in engagement with the upper tenth contact in the third level, conductor 206 included in the ten-conductor 40, conductor 206 at the A-switch indicator lamp panel, through the "0" lamp of the last lamp set, conductor 14, and through armature 16 to battery. In a similar manner the circuit for the "0" lamp in the B-switch indicator lamp panel may be traced as follows: from grounded conductor 126, wiper 269 in engagement with the upper tenth contact in the third level, conductor 258 included in the ten-conductor trunk 60, conductor 258 at the indicator panel, through the "0" lamp, conductor 15 and through armature 17 to battery. By observing the lamp panel, the dispatcher is advised of the fact that the group selector GS and the final selectors AS and BS have been operated to their proper positions by the lighting of the lamps indicated by the heavy black circles in the panel.

The dispatcher now operates the lever key LK to the left or to the right dependent upon whether the signalling devices at points B on line AB or point A on this line are to be operated first. Assuming that the operator desires to operate the signalling devices at point A, the dispatcher will operate the key LK to the right, thereby energizing the AR relay and lighting the A lamp AL over obvious circuits. Relay AR, upon energizing, at armature 17 removes battery from the B-switch indicator lamp panel to indicate that the operate keys LD, OS, BP, BD, and TD are connected by way of armatures 41 to 45, inclusive, and conductors 51 to 55, inclusive, to wipers 261 to 265, inclusive.

As illustrated in the drawings, the connection from the A bus to the point A of the line AB is illustrated as being "alive" or "hot" by the red color on the drums 321 and 323, and 324 showing through the opening in the face equipment at the bus disconnect, the oil switch, and the line disconnect, respectively. For the purpose of illustration, it will be assumed that the dispatcher wishes to disconnect the oil switch from the line AB and A bus, but still maintain the A bus alive. Under these conditions, the operator will operate the by-pass key BP, Fig. 1, to thereby close an operating circuit to the stepping magnet of the associated signalling device. The circuit for operating the stepping magnet 312 may be traced as follows: from ground by way of the grounded hold conductor 12, shunt springs 19 on the dial, conductor 22, by-pass key BP, armature 43, conductor 53, wiper 263 of the switch AS, and through the winding of stepping magnet 312 to battery. By the operation of the key BP, the stepping magnet 312 may be operated over the above-traced circuit to step the colored drum 322 so that any desired color or combination of colors may be seen through the opening in the face equipment. In this case, since it is desired to illustrate the by-pass as being closed, the key BP is operated a number of times to cause the stepping magnet to rotate the colored drum 322 until the red color is seen through the opening of the face equipment, thereby illustrating a closed position. In a similar manner, the operator may now operate the line disconnect key LD a number of times to operate the stepping magnet 314 until the color seen through the opening corresponds to an open position. The circuit for operating the stepping magnet 314 may be traced from grounded conductor 22, through the key LD, armature 45, conductor 55, wiper 265, conductor 284, and through the winding of stepping magnet 314 to battery. In a similar manner, the stepping magnets 311 and 313 are respectively controlled by the operate keys BD and OS over circuits similar to those previously traced. In case the B bus is dead and the dispatcher desires to connect the same to the line AB, the dispatcher will operate the lever key LK to energize the relay BR and light the lamp BL. The AR relay deenergizes and disconnects the operate keys from the wipers of the A switch AS and the AL lamp is extinguished. At armature 17, relay AR again applies negative battery to the lamps of the B-switch indicator lamp panel, thereby lighting the lamps indicated by the heavy black circles. Responsive to the energization of the relay BR, battery is disconnected from the A-switch indicator lamp panel lamps and only the lamps in the B-switch indicator lamp panel are illuminated to indicate that the operate keys are now associated with the B-switch BS. At armatures 23 to 27, inclusive, the operate keys TD, BD, BP, OS, and LD are connected by way of conductors 33 to 37, inclusive, to wipers 273 to 277, inclusive, of the B-switch BS. In a manner similar to the manner described for the signalling devices associated with the A switch, the operation of the operate keys will operate the stepping magnets 335 to 338, inclusive, to rotate the colored drums 345, 346, 338, and 348, so that the desired color shows through the opening in the face equipment to diagrammatically illustrate the open or closed position as desired.

From the foregoing it can be seen that by the operation of the group selector GS and the final selectors, such as AS and BS, that a large number of signalling devices may be simultaneously selected, and by the operation of the lever key LK and the operate keys, any one of these signalling devices may be individually operated to any desired position. This selecting arrangement greatly simplifies the selecting operations necessary for the dispatcher to do, in that, by a single setting of the switches, the dispatcher may operate any one of a large number of signalling devices in any desired sequence without the necessity of operating and releasing the switch train to select the different signalling devices.

After completing the desired operation, the dispatcher will restore the lever key LK to its middle or normal position and will restore the turn key TK to its normal position or the position shown in the drawings. Responsive to the operation of the key TK to its normal position, the lamp SL is extinguished and ground is removed from the hold conductor 12, thereby removing ground from the locked-up vertical bank relays, such as 210 and 232, and from the common conductor 126. When ground is removed from conductor 126, ground is also disconnected from the wipers 134, 266, and 269. By the deenergization of the relays in the vertical bank relay sets, ground is removed from the conductors 207 and 250 with the result that all of the lamps in the lamp panel are now extinguished. The restoration of the key TK to its normal position also grounds the release conductor 11 with the result that the release magnet 137 of the group selector GS is energized by way of vertical off-normal springs 114 to release the group selector in the well-known manner. When the wipers and shaft of the group selector reach their normal positions, the vertical off-normal springs 114 open to open the circuit to the release magnet 137. In a manner similar to that described for the group selector, the final selectors AS and BS are released by the energization of their respective release magnets 204 and 255 over the vertical off-normal springs 203 and 256 to cause the release of the final selector after which the off-normal springs are opened when the switch and shaft and the wipers reach their normal positions. All of the apparatus has now been restored to its normal position and may be used for selecting different points on the line AB or different points on other lines similar to the line AB.

It will be easily seen from the foregoing that the selecting system of this invention may be used wherever this type of selection is required and is not, therefore, limited to the selection of signalling devices associated with a display board.

Having described the invention what is considered to be new and is desired to have protected by Letters Patent, will be set forth in the following claims:

What is claimed is:

1. In a selecting system, a plurality of groups of signalling devices, a corresponding plurality of groups of selectors, a plurality of wipers in each selector, means for simultaneously selectively operating the wipers of different corresponding selectors in each of said groups to corresponding positions to select corresponding signalling devices in each of said groups, multiple connections connecting corresponding wipers in each selector in the same group, a plurality of operate keys corresponding in number to the number of wipers in each selector, a visual indicator for each group of selectors, means including additional wipers on said selectors for simultaneously operating said indicators to indicate the exact positions of the wipers of all operated ones of said selectors, and means for selectively connecting the operate keys to only the multiple connections of a desired one of said selector groups and for indicating such selective connection on said indicators.

2. In a selecting system, groups of devices, a first and a second group of selectors, wipers in each selector and each wiper having access to different groups of devices, selecting means for simultaneously selecting a desired selector in the first group and a corresponding selector in the second group, separate operate means in each selected selector simultaneously operated by said selecting means to operate the wipers of each selected selector to select a different but corresponding group of said devices, a first set of multiple connections corresponding in number to the number of wipers in each selector and each multiple connection connected to a corresponding wiper in each selector in the first group, a second set of multiple connections corresponding in number to the number of wipers in each selector and each multiple connection connected to a corresponding wiper in each selector in the second group, operate keys corresponding in number to the number of wipers in each selector, a relay individual to each set of multiple connections, circuit arrangements for selectively operating either of said relays whereby only one of said relays can be operated at a time, and contacts operated by said relays for connecting each of its individual multiple connections to a corresponding key to prepare only one group of the selected devices for operation over said multiple connections and the wipers of the operated selectors dependent upon the relay operated.

3. In a signalling system, groups of devices, a first and a second group of selectors, wipers in each selector and each wiper having access to different groups of devices, means for simultaneously and selectively operating the wipers of a selector in the first group to select a desired group of devices and the wipers of a selector in the second group to select a corresponding but different group of devices, a first indicator individual to said first group of selectors and a second indicator individual to said second group of selectors, means for simultaneously operating both said indicators to indicate the exact setting of the wipers of the operated selectors, operate keys corresponding in number to the number of wipers in each selector, means for selectively connecting the operate keys to the wipers of either the first or the second group of selectors for preparing either selected group of devices for operation, and means controlled by the operation of said last means for releasing the first indicator in case the operate keys are connected to the wipers of the second group selectors or for releasing the second indicator in case the operate keys are connected to the wipers of the first group selectors to indicate the group of selectors connected to said operate keys.

HARRY E. HERSHEY.

CERTIFICATE OF CORRECTION.

Patent No. 1,960,781.                                                  May 29, 1934.

HARRY E. HERSHEY.

It is hereby certified that error appears in the printed specification of the above numbered patent requiring correction as follows: Page 1, line 7, for "music" read mimic; and that the said Letters Patent should be read with this correction therein that the same may conform to the record of the case in the Patent Office.

Signed and sealed this 11th day of September, A. D. 1934.

Leslie Frazer (Seal)                                Acting Commissioner of Patents.